United States Patent
Arnold et al.

(10) Patent No.: US 7,844,254 B2
(45) Date of Patent: Nov. 30, 2010

(54) METHOD AND APPARATUS FOR COLLABORATION AND MEDIA ACCESS USING MOBILE COMMUNICATIONS DEVICES

(75) Inventors: James Frederick Arnold, Helena, MT (US); Douglas A. Bercow, Menlo Park, CA (US); William S. Mark, San Mateo, CA (US); Norman D. Winarsky, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 1171 days.

(21) Appl. No.: 10/867,612

(22) Filed: Jun. 14, 2004

(65) Prior Publication Data

US 2004/0252654 A1   Dec. 16, 2004

Related U.S. Application Data

(60) Provisional application No. 60/478,440, filed on Jun. 12, 2003.

(51) Int. Cl.
*H04M 1/66* (2006.01)
*H04M 3/42* (2006.01)
*H04W 24/00* (2009.01)
*G06Q 40/00* (2006.01)

(52) U.S. Cl. ............... 455/411; 455/414.1; 455/414.2; 455/456.1; 455/456.3; 705/44

(58) Field of Classification Search ............... 455/466, 455/412.1, 410, 411, 433; 445/410–414.3, 445/456.1–456.3
See application file for complete search history.

(56) References Cited

U.S. PATENT DOCUMENTS

| | | | |
|---|---|---|---|
| 6,100,882 A | 8/2000 | Sharman et al. | |
| 6,269,349 B1 * | 7/2001 | Aieta et al. | 705/80 |
| 6,282,278 B1 | 8/2001 | Doganata et al. | |
| 6,523,061 B1 | 2/2003 | Halverson et al. | |
| 6,925,298 B2 * | 8/2005 | Ho | 455/411 |
| 6,925,307 B1 * | 8/2005 | Mamdani et al. | 455/466 |
| 6,968,177 B2 * | 11/2005 | Miller et al. | 455/411 |
| 7,065,341 B2 * | 6/2006 | Kamiyama et al. | 455/411 |
| 7,234,156 B2 * | 6/2007 | French et al. | 726/2 |
| 2002/0071416 A1 | 6/2002 | Carlson et al. | |
| 2002/0072350 A1 * | 6/2002 | Fukuzato | 455/412 |
| 2003/0005132 A1 | 1/2003 | Nguyen et al. | |
| 2003/0092426 A1 * | 5/2003 | Macor | 455/412 |
| 2004/0171369 A1 * | 9/2004 | Little et al. | 455/410 |

* cited by examiner

*Primary Examiner*—Patrick N Edouard
*Assistant Examiner*—Huy C Ho

(57) ABSTRACT

In one embodiment, a new method enables an individual to selectively preserve the integrity of potentially private data such as identity, current location and the like while using a mobile communications device (e.g., a cell phone) for media access. In one embodiment, the method receives a request for media content from the user in the form of a verbal command. The method then determines whether execution of the command would require the revelation of any potentially private user information. If execution would require such a revelation, the method prompts the user to either permit revelation of the information or to reformulate the request in a way that would not require the information to be revealed. Once data integrity has been resolved, the method searches for and retrieves the requested content.

21 Claims, 5 Drawing Sheets

METHOD AND APPARATUS FOR COLLABORATION AND MEDIA ACCESS USING MOBILE COMMUNICATIONS DEVICES

CROSS REFERENCE TO RELATED APPLICATIONS

This application claims the benefit of U.S. Provisional Patent Application Ser. No. 60/478,440, filed Jun. 12, 2003 (titled "Methods for Collaboration Using Mobile Devices"), which is herein incorporated by reference in its entirety.

FIELD OF THE INVENTION

The present invention relates generally to mobile communications devices and relates more specifically to a method and apparatus for preserving data integrity during media access using mobile communications devices.

BACKGROUND OF THE DISCLOSURE

Always-on, always-connected communication to mobile devices will drive the next great communications market, much as the Internet did in the 1990s. New products, applications and services will emerge, creating entirely new patterns of behavior.

Present day mobile systems have limited capability to address the needs of this emerging market, as such systems tend to be limited by current interface paradigms (e.g., small keyboards and displays) and require users to engage in tedious and time consuming low-level tasks. Incompatibility of services with currently available devices (e.g., due to computational or human interface issues) and a lack of available security also tend to dissuade prudent consumers from using their mobile devices for the transmission of sensitive data such as commercial transactions.

Thus, there is a need in the art for a method and apparatus for collaboration and media access using mobile communications devices.

SUMMARY OF THE INVENTION

In one embodiment, the present invention relates to a method and apparatus for collaboration and media access using mobile communications devices. In one embodiment, the present invention provides a new method that enables an individual to selectively preserve the integrity of potentially private data such as identity, current location and the like while using a mobile communications device (e.g., a cell phone) for media access. In one embodiment, the method receives a request for media content from the user in the form of a verbal command. The method then determines whether execution of the command would require the revelation of any potentially private user information. If execution would require such a revelation, the method prompts the user to either permit revelation of the information or to reformulate the request in a way that would not require the information to be revealed. Once data integrity has been resolved, the method searches for and retrieves the requested content.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method for preserving data integrity during media access using mobile communications devices. Specifically, the method enables a mobile device user to preserve the integrity of potentially private information while using a mobile communications device to engage in high-level applications, including requests for group communications and media searches, among others.

Figure 1:
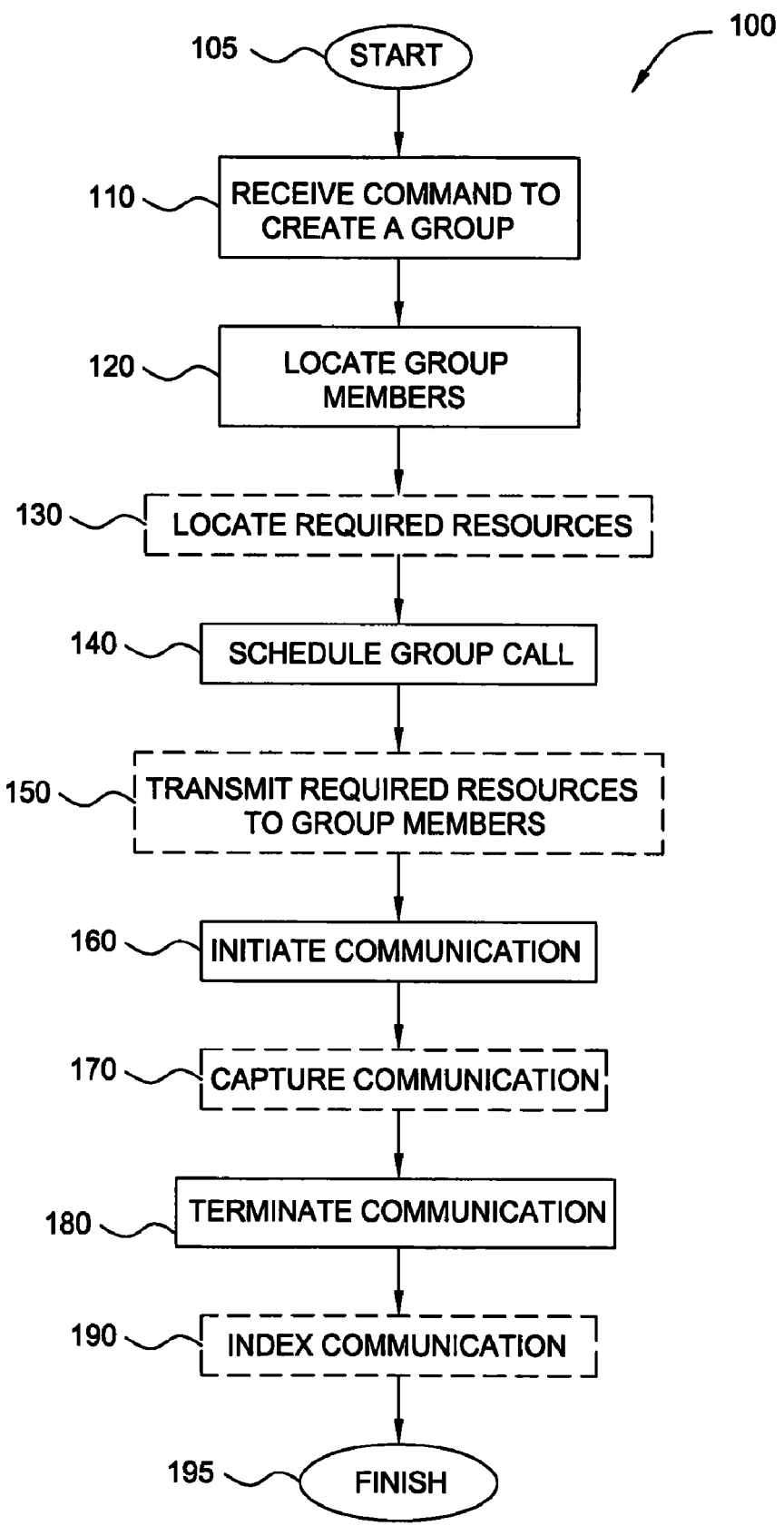
FIG. 1 illustrates a flow diagram that depicts one embodiment of a method for group communication and collaboration using mobile devices, in which features of the present invention may be deployed.

FIG. 1 illustrates a flow diagram that depicts one embodiment of a method 100 for group communication and collaboration using mobile devices, in which features of the inventive method for data preservation may be deployed. Optional steps in the method 100 are indicated by dashed boxes. The method 100 is initialized at step 105 and proceeds to step 110, where the method 100 receives a user command to create a group. In one embodiment, the command is a verbal command, such as, "Set up a secure conference call no later than 12 PM today with Mike, Ben, Alice and Jan at MBA&J, Inc., to discuss the revisions to the widget contract". In one embodiment, the method 100 parses the verbal command using conventional speech recognition and/or natural language programs, in order to extract names (and, optionally, their affiliations) and the purpose of the requested communication. In one embodiment, the method 100 "listens" for keywords in the received command, in order to limit the number of potential tasks to a group that might reasonably be requested.

Once the method 100 has received and parsed a user command, the method 100 proceeds to step 120 and locates the requested group members (e.g., Mike, Ben, Alice and Jan in the above example). In one embodiment, location of group members is accomplished through interaction of the method 100 with a networked calendar/scheduling service (e.g., Microsoft Exchange or Yahoo! Calendar) or a client-resident calendaring program (e.g., Palm Desktop). In another embodiment, the method 100 uses structured electronic mail communications, generated speech telephonic communications or similar means in step 120 to determine the availability and contact information for requested group members. In one embodiment, if the method 100 cannot determine availability and contact information for one or more requested group members, the method 100 queries the mobile device user requesting the collaboration and stores the responses for future communications. In another embodiment, scheduling is enabled to include participants for whom electronic calendar services are not available.

In one embodiment, the method 100 proceeds to step 130 after locating the requested group members and locates any resources referred to in the user command. For example, in the example above, the method 100 might locate and retrieve the "widget contract" for use in the requested conference call. In one embodiment, resources are located according to a method described in greater detail with reference to FIG. 2.

Once the location and availability information for the requested group members and any necessary resources have been retrieved, the method 100 proceeds to step 140 and collates the retrieved information, together with any constraints set forth in the original user command (e.g., no later than 12 PM today"), to determine an available time to schedule the group communication (e.g., the conference call). In one embodiment, conventional constraint reasoning programs are employed by the method 100 to perform the collation. In another embodiment, the method 100 queries the user to resolve conflicts, to determine if one or more requested group members is unnecessary, or to execute alternative scheduling strategies. For example, depending on the urgency and required resources (e.g., if a document must be collaboratively edited), alternative times may be preferable for collaboration, or user feedback may be solicited to resolve conflicting requirements that are not simultaneously achievable. In one embodiment, a spoken language interface is used to solicit feedback from the user. In one embodiment, user feedback is stored and indexed if the strategy embodied therein is of a general nature, so that the method 100 may rely on such feedback to resolve future conflicts without interrupting the user.

In one embodiment, the method 100 also determines the cost and appropriateness of alternative means of communication while scheduling the collaboration in step 140. For example, the method 100 may consider means such as land-line telephone service, cellular networks, satellite or the Internet, among others. For example, if all group members will be desk-bound at the proposed collaboration time, different (and more capable) devices would likely be available than if the group members were at the airport using, for example, cellular telephones. The cost of each means may be considered, along with an assessment of the means's appropriateness, which may be based on the capability and available bandwidth of the group members' devices.

This estimation can be made based on information from a number of sources, including carrier-provided 'presence detection' (e.g., whether a user is in a cell phone service area, with the phone on), internet presence (e.g., as provided by instant messenger programs such as those available from America Online and Yahoo!) and the known data rate capacities of each available medium. Personal calendar information and GPS applications can also indicate a person's location (e.g., a location on a road, especially if varying or moving, may indicate that a voice conversation via a cell channel is most appropriate; if the user is in the office, a video conference may be more appropriate). User preferences, either directly set by the user (e.g., "never schedule meetings before 9 AM!"), or learned experientially by observing user behavior at various times and locations, can also be used. Information pertaining to the costs of certain communications options could be stored locally on user devices, or a remotely in a service providers' database.

At step 150, the method 100 transmits any required resources (e.g., the resources retrieved in step 130) to the group members. In one embodiment, the resources are transmitted using a secure communication channel.

Once the method 100 has successfully scheduled a group communication, the method 100 proceeds to step 160 and initiates communication between the members of the group at the scheduled time. In one embodiment, the established communication is limited to audio communication and can be established using traditional telephony services, using voice-over-IP (VoIP), or using any other appropriate means for initiating audio communication. In another embodiment, the established communication employs richer, multi-modal communications and utilizes protocols for simultaneous audio, video and text communication and document sharing, or any combination thereof. In one embodiment, the multi-modal communications means is Microsoft NetMeeting or video conferencing.

In one embodiment, the method 100 records the group communication at step 170. In one embodiment, the recorded communication is stored at a central server supplied, for example, by a communications or other service provider. In another embodiment, the recorded communication is stored locally on a user device (e.g., commercially available memory cards for cell phones may store approximately 500 hours of voice data). Once the group communication has completed (e.g., accomplished any necessary tasks), the method 100 terminates the group communication at step 180. In one embodiment, if the method 100 has recorded the group communication, the method 100 indexes the group communication at step 190. In one embodiment, indexing of the group communication involves the use of speech-to-text systems, natural language analysis and keyword spotting technologies to determine topic boundaries in the group communication. The method 100 terminates at step 195.

Figure 2:
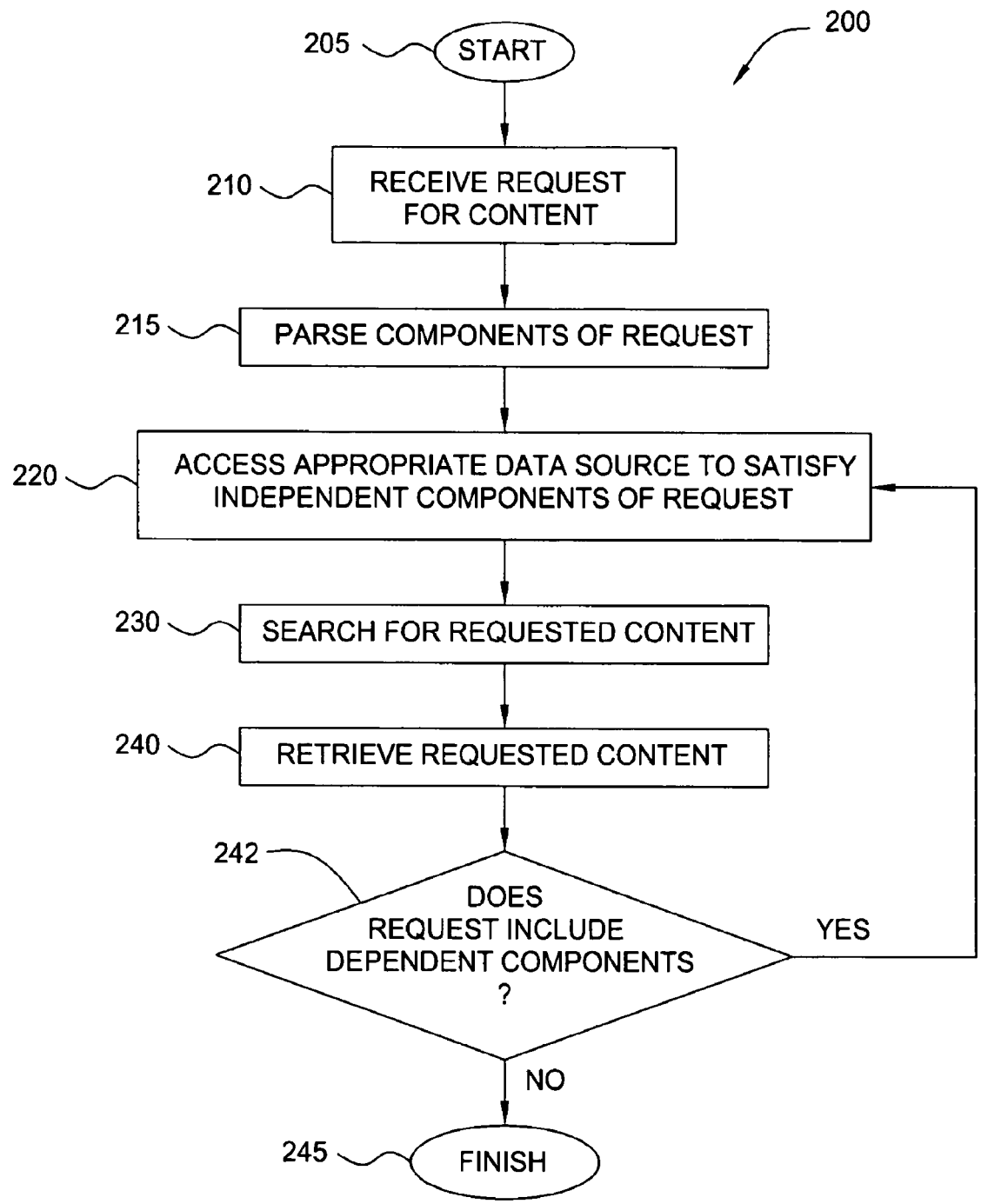
FIG. 2 illustrates a flow diagram that depicts one embodiment of a method for searching resources according to the present invention, in which features of the present invention may be deployed.

FIG. 2 illustrates a flow diagram that depicts one embodiment of a method 200 for searching resources, in which features of the inventive method for data preservation may be deployed as described further below. The method 200 may be implemented, for example, in step 130 of the method 100 to locate resources required by a user's given command for a group communication. The method 200 is an intelligent media access and discovery application that allows a user to discover and retrieve distributed media, regardless of format, location or application in a simple, user-friendly manner.

The method 200 is initiated at step 205 and proceeds to step 210, where the method 200 receives a request for content (e.g., one or more resources). In one embodiment, the request is received via a natural language interface.

In step 215 the method 200 parses the received request for components of the request. Some requests may contain only a single component (e.g., "Look up the box score for last night's Cubs game"). More complex requests may involve multiple layers of queries. For example, if the request is, "Look up the box score for last night's Cubs game and download video highlights", the method 200 is asked to fulfill two components of the request: (1) Look up the box score for last night's Cubs game; and (2) Download the video highlights. In this example, the two components of the request may be referred to as independent components, because each component is independent of the other. That is, each component can be satisfied on its own, without requiring any knowledge or satisfaction of the other component. For example, the method 200 does not need to know what the box score of the Cubs game is in order to retrieve the game's video highlights, and vice versa.

Alternatively, the method 200 may receive a request having multiple components that are not entirely independent of each other, such as, "Play an MP3 of the song Justin Timberlake performed at last night's MTV awards". In this case, there is a dependent component of the request (e.g., play the song) that cannot be addressed or satisfied until an independent component (e.g., identify the song) is satisfied first. That is, the method 200 cannot search for or play the requested song until the method 200 knows for which song it is looking. In other embodiments, a request may include multiple dependent components of arbitrary dependency. For example, a request to "Do A, B, C and D" could include the dependencies "A before B", "A before C", "C before B" and "B before D". In one embodiment, standard methods in the art of graph theory are employed to detect any cycles in dependencies that may render the dependencies inherently unable to be satisfied.

Once a request for content is parsed into components, the method 200 proceeds to step 220 and selects the appropriate data sources for the requested content, starting in one embodiment with the independent components. In one embodiment, the method 200 has access to a wide variety of data sources, including, but not limited to, the World Wide Web and public and private databases. Data source selection according to step 220 may be performed based on a number of criteria. In one embodiment, data source selection is performed using topic spotting, e.g., analyzing natural language contained within the received request to determine a general area of inquiry. For the example request above, topic spotting could reveal "sports" or "baseball" as the general area of inquiry and direct the method 200 to appropriate data sources. In one embodiment, narrowing data source selection enables a more efficient search (e.g., identifies fewer, more accurately disposed data sources).

In step 230, the method 200 searches the selected data sources for the requested content. In one embodiment, one or more of the data sources are indexed and searched thereby. In one embodiment, the data sources are indexed and searched according to the methods described in co-pending, commonly assigned U.S. patent application Ser. No. 10/242,285, filed Sep. 12, 2002 by Stringer-Calvert et al. (entitled "Methods and Apparatus for Providing Scalable Resource Discovery"), which is herein incorporated by reference. In other embodiments, the method 200 may implement any efficient searching technique in step 230.

In step 240, the method 200 retrieves the requested content (e.g., any independent components of the request). In one embodiment, retrieved content is directly presented to the user. In another embodiment, the retrieved content is stored for future presentation and/or reference.

In step 242, the method 200 asks if the request received in step 210 includes any outstanding dependent components that may now be searched based on content retrieved for independent components. If the request does not contain any outstanding dependent components, the method 200 terminates in step 245. If the request does include outstanding dependent components, the method 200 repeats steps 220-240 for the outstanding dependent components. Content retrieved for the independent components may be used to aid in the search for content requested in a dependent request component (e.g., may be used to narrow data source selection or search within data sources).

Figure 3:
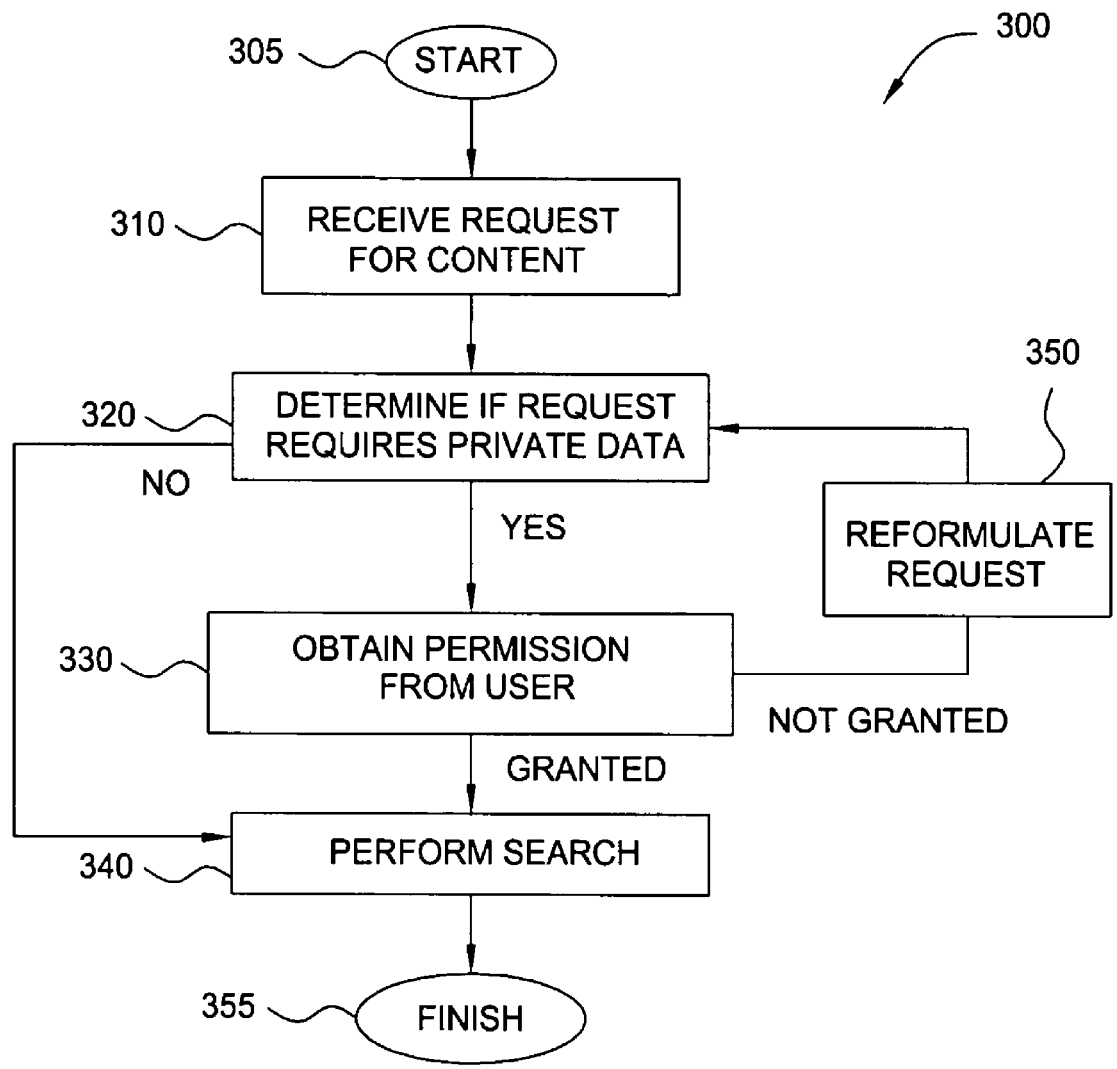
FIG. 3 illustrates a flow diagram that depicts one embodiment of a method for preserving data integrity during media access using mobile communications devices, according to the present invention.

FIG. 3 illustrates a flow diagram that depicts one embodiment of a method 300 for preserving data integrity during media access using mobile communications devices, according to the present invention. The method 300 may be implemented, for example, as an enhancement to the method 200 and deployed in step 130 of the method 100 to locate resources required by a user's given command for a group communication. The method 300 is an intelligent media access and discovery application that allows a user to discover and retrieve distributed media without compromising the user's private information (e.g., location or more general user information).

The method 300 is initialized at step 305 and proceeds to step 310, where the method 300 receives a request for content from a user. In one embodiment, the request is received in the form of a natural language query, although, in other embodiments, other forms of query may be received.

In step 320, the method 300 analyzes the received request for private information. In one embodiment, private information is defined as any information stored in a mobile device's local knowledge base, and may include, for example, the user's address, social security number, credit card information, phone number, stored results of previous requests and the like. In one embodiment, private information further includes the output of sensors, such as GPS receivers, coupled to the mobile device. For example, if the received request is, "Tell me how to get to the nearest copy center", the method 300 understands the relative term "nearest" to be in relation to the user's current location, for example as sensed by a GPS receiver, and information pertaining to the user's current location is considered potentially private.

If the method 300 determines that the received request does not involve any potentially private information, the method 300 proceeds to step 340 and performs a search for the requested content, for example in accordance with the method 200, although alternative searching methods may be employed. Alternatively, if the method 300 determines that the received request does involve potentially private information, the method 300 proceeds to step 330 to obtain user permission to proceed with the search for content. In one embodiment, the query includes the information that would be shared in the execution of the search, for example in the form of a warning dialog such as, "Performing this search would require divulging the following private information: your current location. Proceed?". Those skilled in the art will appreciate that other dialogs may be employed depending on the type of private information that may be revealed.

If the method 300 obtains permission from the user in step 330, the method 300 proceeds to step 340 and performs the search for the requested content, as described above. If the method 300 does not obtain user permission, the method 300 proceeds to step 350 and reformulates the user's request, if possible, in order to phrase the request in terms that do not require the revelation of private information. In one embodiment, reformulation in accordance with step 350 uses templates that provide hints for alternate request construction. For example, a template could suggest that in the case of location information, a larger geographic region (such as a city or zip code) be given instead of an exact location. Thus, the request for a copy center could be reformulated as, "What copy centers are there in San Francisco?", thereby revealing less private information. Once the request is reformulated, the method 300 repeats steps 320 and 330 (and, possibly, 350), until the method 300 receives or produces a request that the user approves, and then performs a search in step 340.

Alternatively, once the request has been reformulated, the method 300 may proceed directly to step 340, without further request for user permission. In another embodiment, the method 300 may provide the user with an option to cease receiving requests for permission. The method 300 then terminates in step 355.

In one embodiment, search results relating to locations (e.g., a list of copy centers in San Francisco) contain geographic coordinates or addresses from which geographic coordinates may be calculated. Simple arithmetic over the coordinates could then determine the appropriate (e.g., nearest) location. In another embodiment, several individual locations are displayed to the user on a local map along with a marker for the user's present location.

Figure 4:
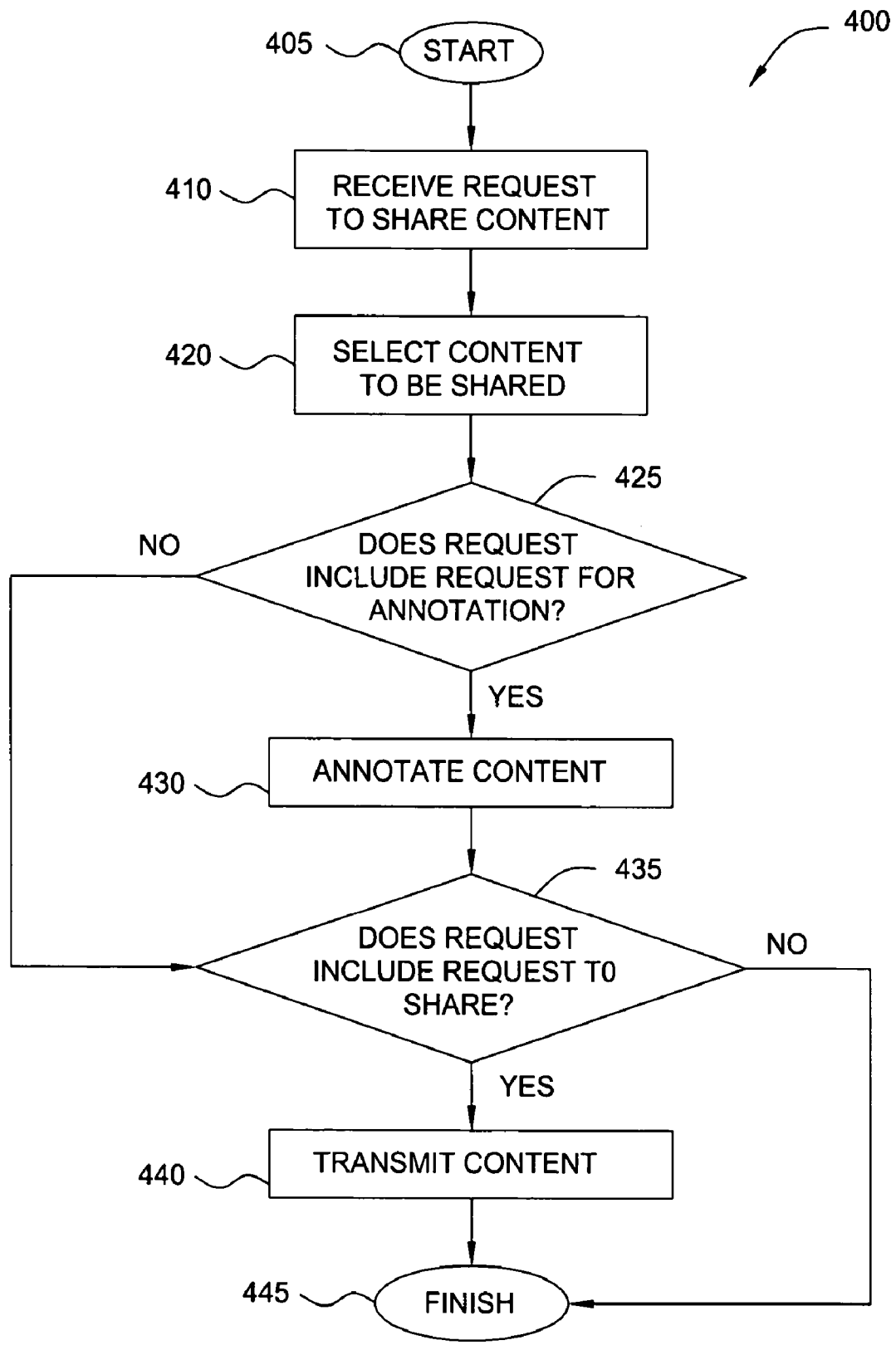
FIG. 4 illustrates a flow diagram that depicts one embodiment of a method for annotating and sharing resources, in which features of the present invention may be deployed.

FIG. 4 illustrates a flow diagram that depicts one embodiment of a method 400 for annotating and sharing resources, in which features of the present data preservation method may be deployed. The method 400 is a collaboration application that enables effective annotation and sharing of resources, such as digital photographs. In one embodiment, the method 400 for sharing resources may be executed simultaneously with a multi-way communication, e.g., to allow users to share what they are doing at any moment during the communication. The interfaces provided by present day devices such as camera phones and digital cameras do not generally make it easy for users to annotate and distribute images, as they tend to be tedious, lacking in functionality or require additional devices (such as personal computers) to accomplish the annotation and transfer.

The method 400 is initialized at step 405 and proceeds to step 410, where the method 400 receives a request to annotate and/or share content. For example, the request may be a verbal command such as, "Name this 'Tommy's First Hit'" or "Call Grandpa Bob and share this" or "Send Grandma the picture of Tommy's First Hit".

In step 420, the method 400 selects the content to be shared and/or annotated, based upon the request received in step 410. In one embodiment, references to "this" (e.g., "Name this 'Tommy's First Hit'") are interpreted in step 420 to mean either the media object that the user is currently viewing, or, if the user is not currently viewing a media object, the media object most recently captured on the user's device (e.g., the last digital photograph taken).

In step 425, the method 400 determines whether the request received in step 410 includes a request to annotate content. If the request does include a request for annotation, the method 400 annotates the content in step 430, and proceeds to step 435, where the method 400 further determines if the request received in step 410 includes a request to share content with another individual. Alternatively, if the method 400 determines in step 425 that the request received in step 410 does not include a request to annotate content, the method 400 proceeds directly to step 435. In one embodiment, annotation in accordance with step 430 is accomplished using joint photographic experts group (JPEG) comments, extensible markup language (XML) markup, moving picture experts group (MPEG) description fields or other conventional methods of annotation.

If the method 400 determines in step 435 that the request received in step 410 includes a request to share content, the method 400 proceeds to step 440 and transmits the indicated content to the intended recipient(s). The method 400 then terminates in step 445. Alternatively, if the method 400 determines that the request received in step 410 does not include a request to share content, the method 400 proceeds directly to step 445 and terminates.

Figure 5:
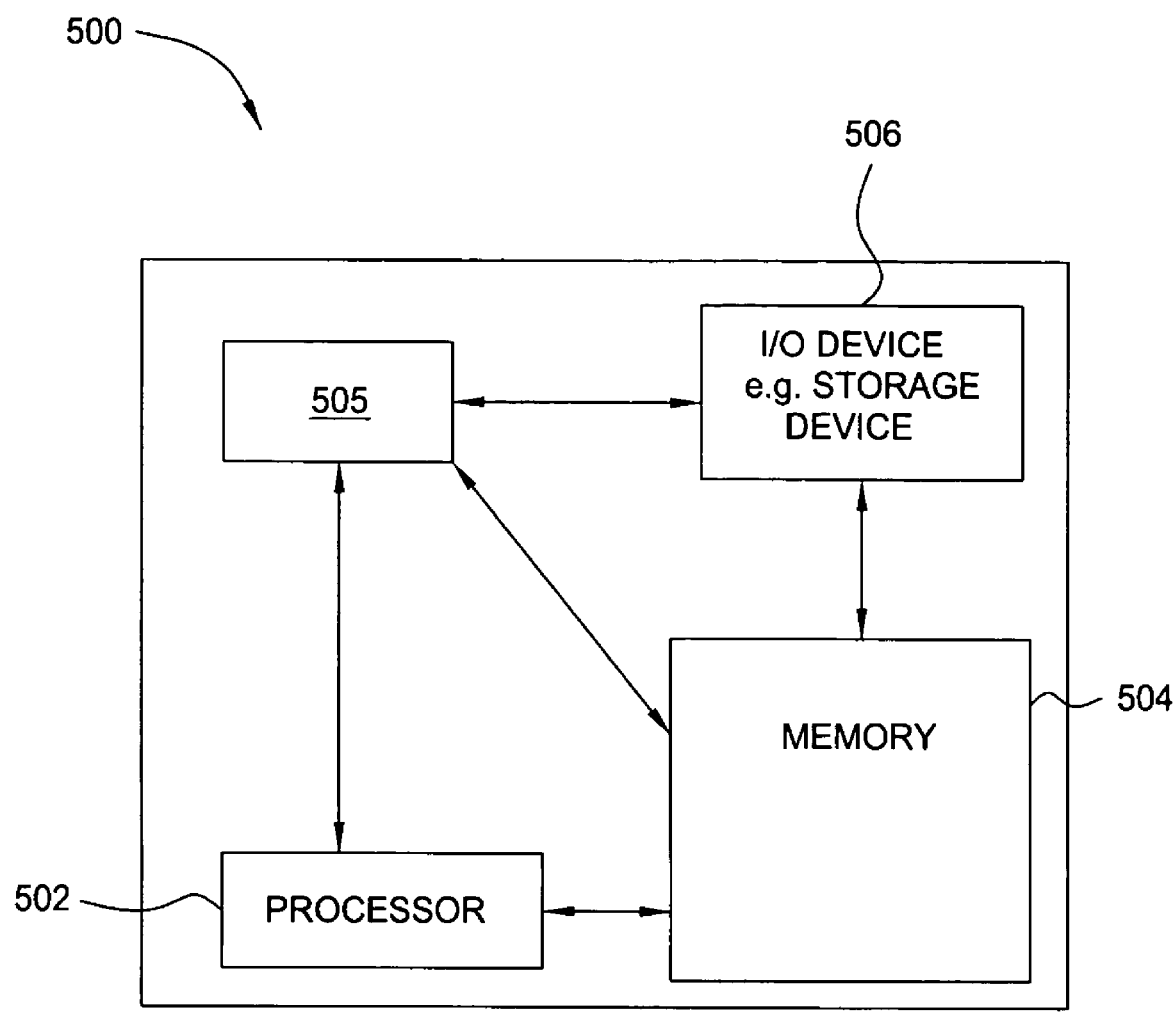
FIG. 5 is a high level block diagram of the present method for preserving data integrity during media access using mobile communications devices that is implemented using a general purpose computing device.

FIG. 5 is a high level block diagram of the present method for group communication and collaboration that is implemented using a general purpose computing device 500. In one embodiment, a general purpose computing device 500 comprises a processor 502, a memory 504, a data preservation module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the data preservation module 505 can be implemented as a physical device or subsystem that is coupled to a processor through a communication channel.

Alternatively, data preservation module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the data preservation module 505 for preserving data integrity described herein with reference to the preceding Figures can be stored on a computer readable medium or carrier (e.g., RAM, magnetic or optical drive or diskette, and the like).

Thus, the present invention represents a significant advancement in the field of mobile communications. A method is provided that enables a user to retrieve or share content or to execute commands without revealing potentially private information, thereby providing the necessary security to enable mobile communications devices to exploit the full potential of their computing power. Thus, a mobile communications device such as a cell phone may be reliably used to execute high-level applications such as business data transfer and electronic commerce without the potential for revealing private information to unwanted parties.

Although various embodiments which incorporate the teachings of the present invention have been shown and described in detail herein, those skilled in the art can readily devise many other varied embodiments that still incorporate these teachings.

What is claimed is:

1. A method for accessing media content using a mobile communications device, said method comprising steps of:
    receiving, by the mobile communications device, a first user request from a user for media content;
    analyzing, by the mobile communications device, the first user request for private information; and
    prompting, by the mobile communications device, the user for feedback if an execution of the first user request requires a revelation of said private information, wherein the private information includes an output of one or more sensors coupled to the mobile communications device, and wherein the step of prompting the user for feedback comprises:
        identifying one or more terms in the first user request that contain said private information;
        alerting the user to a fact that said execution of the first user request will require the revelation of said one or more terms that contain said private information;
        soliciting a user permission to execute the first user request;
        generating, by the mobile communications device, one or more new terms that correspond to the one or more terms, where the one or more new terms contain less private information relative to the one or more terms, if said user permission is not granted; and
    reformulating, by the mobile communications device, the first user request, prior to submitting said first user request for execution, as a second user request that uses said one or more new terms.

2. The method of claim 1, wherein said one or more sensors is a global positioning system receiver.

3. The method of claim 1, further comprising the steps of:
    searching for the requested media content based on the second user request; and
    delivering the requested media content to the user.

4. The method of claim 1, wherein the step of reformulating the first user request comprises:
   prompting the user for permission to execute the second user request, subsequent to the reformulating.

5. The method of claim 1, further comprising:
   executing the second user request without soliciting a user permission to execute the second user request.

6. The method of claim 1, further comprising:
   providing the user with an option to avoid receiving requests for said user permission; and
   receiving a user selection in response to said option.

7. The method of claim 1, wherein the first user request is a natural language query.

8. The method of claim 1, wherein said private information also includes any information stored in a local knowledge base of the mobile communications device.

9. The method of claim 1, wherein the private information also pertains to personal information of the user or to one or more of previous requests of the user.

10. The method of claim 1, wherein a content of the private information relates to the media content.

11. A computer readable storage medium containing an executable program for accessing media content using a mobile communications device, where the program performs the steps of:
    receiving, by the mobile communications device, a first user request from a user for media content;
    analyzing, by the mobile communications device, the first user request for private information; and
    prompting, by the mobile communications device, the user for feedback if an execution of the first user request requires a revelation of said private information, wherein the private information includes an output of one or more sensors coupled to the mobile communications device, and wherein the step of prompting the user for feedback comprises:
       identifying one or more terms in the first user request that contain said private information;
       alerting the user to a fact that said execution of the first user request will require the revelation of said one or more terms that contain said private information;
       soliciting a user permission to execute the first user request;
       generating, by the mobile communications device, one or more new terms that correspond to the one or more terms, where the one or more new terms contain less private information relative to the one or more terms, if said user permission is not granted; and
    reformulating, by the mobile communications device, the first user request, prior to submitting said first user request for execution, as a second user request that uses said one or more new terms.

12. The computer readable storage medium of claim 11, wherein said one or more sensors is a global positioning system receiver.

13. The computer readable storage medium of claim 11, further comprising the steps of:
    searching for the requested media content based on the second user request; and
    delivering the requested media content to the user.

14. The computer readable storage medium of claim 11, wherein the step of reformulating the first user request comprises:
    prompting the user for permission to execute the second user request, subsequent to the reformulating.

15. The computer readable storage medium of claim 11, further comprising:
    executing the second user request without soliciting a user permission to execute the second user request.

16. The computer readable storage medium of claim 11, further comprising:
    providing the user with an option to avoid receiving requests for said user permission; and
    receiving a user selection in response to said option.

17. The computer readable storage medium of claim 11, wherein the first user request is a natural language query.

18. The computer readable storage medium of claim 11, wherein said private information also includes any information stored in a local knowledge base of the mobile communications device.

19. The computer readable storage medium of claim 11, wherein the private information also pertains to personal information of the user or to one or more of previous requests of the user.

20. The computer readable storage medium of claim 11, wherein a content of the private information relates to the media content.

21. Apparatus for remotely accessing media content, comprising:
    means for receiving a first user request from a user for media content;
    means for analyzing the first user request for private information; and
    means for prompting the user for feedback if an execution of the first user request requires a revelation of said private information, wherein the private information includes an output of one or more sensors coupled to the mobile communications device, and wherein the means for prompting the user for feedback comprises:
       means for identifying one or more terms in the first user request that contain said private information;
       means for alerting the user to a fact that said execution of the first user request will require the revelation of said one or more terms that contain said private information;
       means for soliciting a user permission to execute the first user request;
       means for generating one or more new terms that correspond to the one or more terms, where the one or more new terms contain less private information relative to the one or more terms, if said user permission is not granted; and
       means for reformulating the first user request, prior to submitting said first user request for execution, as a second user request that uses said one or more new terms, wherein said apparatus comprises a mobile communications device.

* * * * *